United States Patent [19]
Kadri

[11] Patent Number: 6,127,444
[45] Date of Patent: Oct. 3, 2000

[54] POLYMERIC COMPOUND, USE OF THAT COMPOUND IN A FOAM PRODUCTION PROCESS, A FOAMING PROCESS, FOAMED COMPOUNDS AND ARTICLES CONTAINING FOAMED COMPOUNDS

[75] Inventor: Ilham Kadri, Louvain-la-Neuve, Belgium

[73] Assignee: Shell Oil Company, Houston, Tex.

[21] Appl. No.: 09/388,410

[22] Filed: Sep. 1, 1999

[30] Foreign Application Priority Data

Sep. 1, 1998 [EP] European Pat. Off. ............. 98307016

[51] Int. Cl.$^7$ ...................................................... C08J 9/00
[52] U.S. Cl. ........................... 521/139; 521/81; 521/134; 521/140; 525/98; 525/99
[58] Field of Search .................... 521/134, 139, 521/140, 81; 525/98, 99

[56] References Cited

U.S. PATENT DOCUMENTS

| | | | |
|---|---|---|---|
| Re. 33,832 | 2/1992 | Yoshimura et al. | 525/92 |
| 3,231,635 | 1/1966 | Holden et al. | 260/880 |
| 3,251,905 | 5/1966 | Zelinski | 260/879 |
| 3,390,207 | 6/1968 | Moss et al. | 260/879 |
| 3,598,887 | 8/1971 | Darcy et al. | 260/879 |
| 3,700,633 | 10/1972 | Wald et al. | 260/880 |
| 4,219,627 | 8/1980 | Halasa et al. | 525/89 |
| 4,677,133 | 6/1987 | Leicht | 521/51 |
| 4,835,218 | 5/1989 | Yoshimura et al. | 525/95 |
| 4,994,508 | 2/1991 | Shiraki et al. | 524/14 |
| 5,248,725 | 9/1993 | Sawada et al. | 428/35.2 |
| 5,445,862 | 8/1995 | Kaneko | 521/92 |
| 5,585,411 | 12/1996 | Hwo | 521/98 |
| 5,939,483 | 8/1999 | Kneppers | 525/99 |

FOREIGN PATENT DOCUMENTS

| | | | |
|---|---|---|---|
| 0387671 | 3/1990 | European Pat. Off. | C08F 2/42 |
| 0413294 | 8/1990 | European Pat. Off. | C08F 297/02 |
| 0636654 | 7/1994 | European Pat. Off. | C08L 53/02 |
| 0569831 A1 | 6/1995 | European Pat. Off. | |
| 0656036 | 6/1995 | European Pat. Off. | C08L 23/20 |
| 0733677 A1 | 9/1996 | European Pat. Off. | |
| 0875526 A2 | 11/1998 | European Pat. Off. | |
| 58-173146 | 10/1983 | Japan | C08L 53/02 |
| 58-222143 | 12/1983 | Japan | C08J 9/12 |
| 7-149999 | 6/1995 | Japan | C08L 53/02 |
| WO 94/22931 | 10/1994 | WIPO | C08F 297/04 |
| WO 97/00294 | 3/1997 | WIPO | |

*Primary Examiner*—Morton Foelak
*Attorney, Agent, or Firm*—Donald F. Haas

[57] ABSTRACT

The present invention relates to a polymeric compound comprising (a) 100 parts by weight of a block copolymer comprising at least two external monovinyl aromatic hydrocarbon blocks and at least one internal hydrogenated conjugated diene block, wherein the total monovinyl aromatic hydrocarbon content is from 20 to 50% by weight and the total apparent molecular weight is from 140,000 g/mol to 400,000 g/mol;

(b) 50 to 250 phr of a plasticiser;

(c) 10 to 100 phr of a polybutene-1 polymer having a melt index at 2.16 kg/190° C. of from 0.05 to 400;

(d) a blowing agent.

The present invention further relates to use of the compound for the preparation of foamed compounds; to a foaming process; to a masterbatch blend; to a foamed compound; and to articles containing the foamed compound.

21 Claims, No Drawings

POLYMERIC COMPOUND, USE OF THAT COMPOUND IN A FOAM PRODUCTION PROCESS, A FOAMING PROCESS, FOAMED COMPOUNDS AND ARTICLES CONTAINING FOAMED COMPOUNDS

FIELD OF THE INVENTION

The present invention relates to a polymeric compound, in particular a polymeric compound that can be used to produce a foamed compound. The present invention further relates to a foaming process, to a masterbatch blend; to a foamed compound and articles containing the foamed compound.

BACKGROUND OF THE INVENTION

Foamed polymeric compounds are well known in the art and are being used widely in industry for a variety of purposes. Although compounds containing selectively hydrogenated block copolymers of monovinyl aromatic hydrocarbon and conjugated diene have many interesting properties, it has been cumbersome to produce foams from them. Poor melt-elongation behaviour and insufficient melt strength is thought to lead to breakage during foam production, including bubble breakage.

Therefore, the problem the present invention sets out to solve is to provide polymeric compounds which may easily be foamed and produce foamed compounds having desirable properties, preferably a desirable balance of properties.

SUMMARY OF THE INVENTION

Such compounds have now surprisingly been found. Therefore, according to a first aspect, the present invention relates to a polymeric compound comprising (a) 100 parts by weight of a block copolymer comprising at least two external monovinyl aromatic hydrocarbon blocks and at least one internal hydrogenated conjugated diene block, wherein the total monovinyl aromatic hydrocarbon content is from 20 to 50% by weight and the total apparent molecular weight is from 140,000 g/mol to 400,000 g/mol;

(b) 50 to 250 parts by weight per 100 parts by weight of block copolymer (phr) of a plasticiser;

(c) 10 to 100 phr of a polybutene-1 polymer having a melt index at 2.16 kg/190° C. of from 0.05 to 400;

(d) a blowing agent.

With the term "apparent molecular weight" as used throughout the specification is meant the molecular weight of a polymer as measured with gel permeation chromatography (GPC) using polystyrene calibration standards (according to ASTM D 3536).

The melt (flow) index is determined in accordance with ASTM D 1238.

DETAILED DESCRIPTION OF THE INVENTION

The block copolymer (a) may be linear or radial, including linear triblock copolymers (ABA), multi-armed block copolymers ((AB)$_n$X), asymmetric block copolymers, such as ((AB)$_n$X(B')$_m$), with A representing a monovinyl aromatic hydrocarbon polymer block, B and B' representing a hydrogenated conjugated diene polymer block, n being an integer of 2 or higher, preferably from 2 to 6, m being an integer of at least 1, preferably from 1 to 4, and X representing the residue of a coupling agent. The block copolymer may contain up to 30% by weight, relative to the total amount of block copolymer of a diblock copolymer AB, preferably up to 25% by weight, more preferably up to 20% by weight. If it is desired that the block copolymer (a) contains an amount of diblock copolymer, the latter is typically present in an amount of at least 5% by weight, preferably at least 10% by weight of the block copolymer (a).

The apparent molecular weight of diblock copolymer (AB) (if present) is typically in the range of from 40,000 to 270,000. Preferably, the diblock copolymer apparent molecular weight is in the range of from 60,000 to 180,000.

The block copolymer (a) may, for example, be prepared by coupling at least two diblock copolymer molecules AB together. As the coupling efficiency is not 100%, the block copolymer (a) will contain uncoupled diblock copolymer. The block copolymer (a) may however also consist of a blend of block copolymers, one being a diblock copolymer.

The coupling agent may be any di- or polyfunctional coupling agent known in the art, for example, dibromoethane, silicon tetrachloride, diethyl adipate, divinylbenzene, dimethyldichlorosilane, methyl dichlorosilane. Particularly preferred in such a preparation route is the use of non-halogen containing coupling agents, for example gamma-glycidoxypropyl-trimethoxysilane, and diglycidylether of bisphenol A (e.g., EPON Resin 825) (EPON is a trade mark).

The block copolymer to be used in the compound of the present invention may be prepared by any method known in the art including the well known full sequential polymerisation method, optionally in combination with re-initiation, and the coupling method, as illustrated in e.g. U.S. Pat. Nos. 3,231,635; 3,251,905; 3,390,207; 3,598,887 and 4,219,627 and EP 0413294 A2, 0387671 B1, 0636654 A1, WO 94/22931.

The resultant block copolymer is hydrogenated in accordance with any one of the known methods (for example, the method as disclosed in U.S. Pat. No. 3,700,633 which is herein incorporated by reference) to obtain the hydrogenated block copolymer (a). In the hydrogenated block copolymer (a) to be used in the present invention, typically at least 80%, preferably at least 90%, more preferably at least 95% of the double bonds in the conjugated diene block(s) is hydrogenated. The hydrogenation degree can be analysed using the nuclear magnetic resonance (NMR) method.

The mono-vinyl aromatic monomer is typically selected from styrene, $C_1$–$C_4$ alkylstyrene and $C_1$–$C_4$ dialkylstyrene, in particular styrene, α-methylstyrene, o-methylstyrene or p-methylstyrene, 1,3-dimethylstyrene, p-tert.-butylstyrene or mixtures thereof, most preferably styrene.

The conjugated diene monomer is typically a conjugated diene monomer containing from 4 to 8 carbon atoms, such as 1,3-butadiene, 2-methyl-1,3-butadiene (isoprene), 2,3-dimethyl-1,3-butadiene, preferably butadiene or isoprene or mixtures thereof, most preferably butadiene.

The 1,2-vinyl content of a butadiene block prior to hydrogenation is typically at least 25% by weight. Preferably, the vinyl content is in the range of from 30 to 80% by weight, more preferably from 35 to 65% by weight.

Techniques to enhance the vinyl content of the butadiene portion are well known and may involve the use of polar compounds such as ethers, amines and other Lewis bases and more in particular those selected from the group consisting of dialkylethers of glycols. Most preferred modifiers are selected from dialkyl ether of ethylene glycol containing the same or different terminal alkoxy groups and optionally bearing an alkyl substituent on the ethylene radical, such as monoglyme, diglyme, diethoxyethane, 1,2-diethoxypropane, 1-ethoxy-2,2-tert-butoxyethane, of which 1,2-diethoxypropane is most preferred.

The content of monovinyl aromatic hydrocarbon of the final block copolymer is preferably in the range of from 20 to 45% by weight, and more preferably 25 to 40% by weight, based on the total block copolymer.

The total apparent molecular weight of the block copolymer is preferably in the range from 160,000 to 300,000 g/mol.

According to one more preferred embodiment, the total apparent molecular weight of the block copolymer is in the range from 160,000 to less than 220,000 g/mol, more preferably 170,000 to 210,000.

According to another more preferred embodiment, the total apparent molecular weight of the block copolymer is in the range from 220,000 to 300,000 g/mol.

The preferred amount of polybutene-1 (c) relative to the amount of block copolymer is typically from 10 to 100 phr, preferably 15 to 90 phr, more preferably 30 to 80 phr.

The polybutene-1 (polybutylene) referred to herein is preferably a butene-1 polymer typically containing from 80% by weight; preferably from 95% by weight; and more preferably from 97% by weight, of isotactic portions. The weight average molecular weight typically may range from 60,000 to 1,000,000 g/mol, determined by Gel Permeation Chromatography, using polybutene-1 standards. Suitable poly-1-butenes also have a density of from 0.875 to 0.925, preferably from 0.900 to 0.920 and most preferably from 0.910 to 0.915. Suitable poly-1-butenes have melt flow indices in the range of from 0.05 to 400, preferably 0.05 to 300, more preferably from 0.1 to 200, even more preferably from 0.2 to 20, and most preferably from 0.4 to 5 dg/min, as determined by ASTM D-1238 Condition E, at 190° C. and 2.16 kg. The intrinsic viscosity of the poly-1-butene may range from 0.07, preferably from 7 at 130° C. in "decalin" (decahydronaphthalene).

These poly-1-butene polymers including their methods of preparation, and their properties are known in the art. An exemplary reference containing additional information on polybutylene is U.S. Pat. No. 4,960,820 which is herein incorporated by reference.

A poly-1-butene polymer (PB) usable herein is either a butene-1 homopolymer or a copolymer or a terpolymer. If a butene-1 copolymer or terpolymer is used, the non-butene comonomer content is from 1 to 15 mole %, preferably from 1 to 10 mole % of either ethylene, propylene, and/or an alpha olefin having from 5 to 8 carbon atoms. The poly-1-butenes can be modified to increase surface activity by reaction with, for example, maleic anhydride.

Suitable poly-1-butenes can be obtained, for example, in accordance with Ziegler-Natta low-pressure polymerization of butene-1, e.g. by polymerizing butene-1 with catalysts of $TiCl_3$ or $TiCl_3$—$AlCl_3$ and $Al(C_2H_5)_2Cl$ at temperatures of 10–100° C., preferably 20–40° C., e.g. according to the process described in DE-A-1,570,353. It can also be obtained, for example by using $TiCl_4$—$MgCl_2$ catalysts. High melt indices are obtainable by further processing the polymer by peroxide cracking, thermal treatment or irradiation to induce scissions leading to a higher melt flow material.

Preferably, the polybutene-1 may contain up to 15 mole % of copolymerised ethylene or propylene, but is more preferably a homopolymer.

Polybutene-1 PB-0110, marketed by Montell Polyolefins is a particularly suitable polymer. This polymer is a homopolymer with a melt index of 0.4 g/10 min. at 190° C. and 2.16 kg and a weight average molecular weight of 800,000.

Preferably, the polybutene-1 homopolymer has a crystallinity of at least 30% by weight when measured with wide-angle X-ray diffraction after 7 days, more preferably at least 45% by weight, even more preferably at least 55% by weight. Typically the crystallinity is less than 70%, preferably less than 60%.

Plasticisers are well known to those skilled in the art. Typically, the hardness of polymer compound is decreased by adding a plasticiser. The plasticiser is typically substantially compatible with at least the hydrogenated conjugated diene block(s) of the block copolymer (a).

The plasticiser is preferably present in an amount from 80 to 250 phr, more preferably from 90 to 200 phr, in particular from 100 to 180 phr.

Examples of plasticisers commonly used include oil, preferably naphthenic or paraffinic oil, more preferably paraffinic oil. Examples of alternative plasticisers which may be used in the compound of the invention are oligomers of randomly or sequentially polymerised styrene and conjugated diene; oligomers of conjugated diene, such as butadiene or isoprene; liquid polybutene-1, and ethylene-propylene-diene rubber; all having a weight average molecular weight in the range from 300 to 35,000, preferably from 300 to 25,000, more preferably from 500 to 10,000.

As noted above the polymer compound of the present invention also contains a blowing agent. Normally a blowing agent decomposes above a certain temperature thereby releasing gas, such as nitrogen, which causes a volume increase of the reaction mass. The temperature at which the blowing agent starts decomposing is further referred to as the activation temperature. In principle, any known blowing agent may be used. Generally known blowing agents are for instance sodium bicarbonate, azodicarbonamide-based compound and diphenyloxide-4,4'-disulphohydrazide. The latter is commercially available under the trade mark GENITRON OB, while the azodicarbonamide-based compounds are commercially available under the trade mark GENITRON EPE, EPA and EPB.

Alternative blowing agents are heat expandable thermoplastic particles encapsulating heat expandable gas or liquified gas. Such heat expandable thermoplastic particles are known in the art and available commercially under the trade mark EXPANCEL. Further details regarding such heat-expandable thermoplastic particles can e.g. be obtained from EP0717091A2, which is incorporated herein by reference.

Preferably, the blowing agent is azodicarbonamide or sodium bicarbonate or mixtures thereof. Especially good results have been obtained with sodium bicarbonate.

The blowing agent is preferably present in an amount from 0.5 to 10% wt., basis the total composition, more preferably 1 to 5% by weight.

Optionally, the polymeric compound further comprises from 5 to 50 phr of a polyolefin other than polybutene-1, having a melt flow index at 230° C. and 2.16 kg of 0.1 to 40, preferably 0.1 to 20, more preferably 0.2 to 15.

Typically, the polyolefin is selected from polyethylene, polypropylene and copolymers thereof. Preferably, the polyolefin is polypropylene or polyethylene, in particular LLDPE. More preferably, the polyolefin is polypropylene.

In order to improve high temperature properties of the polymeric compound, it may be preferred that the polymeric compound further comprises polyphenylene ether (PPO), typically in an amount from 10 to 100 phr, preferably 20 to 80 phr, more preferably 30 to 70 phr.

Polyphenylene ethers (PPE) resins used in this invention are commercially available and are produced by techniques well known in the art, such as by oxidizing a phenol with an oxygen-containing gas in the presence of a catalyst system comprising a cuprous salt and a tertiary amine. Suitable PPE resins are homo- and copolymers with repeating units of the formula

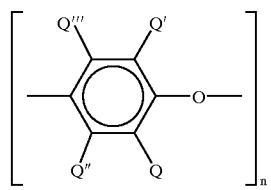

wherein Q, Q', Q" and Q''', are independently selected from the group consisting of hydrogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atom and the phenol nucleus. In addition, Q', Q" and Q''' may be halogen with the proviso that if Q', Q" or Q''' are halogen Q and Q' are preferably free of tertiary carbon atoms. The total number of monomer residues is represented by n, which is an integer of at least 50. An especially preferred PPE resin is poly(2,6-dimethyl-1,4-phenylene) ether.

It will be appreciated that the compounds of the present invention may further contain additional compounds like stabilisers, fillers, waxes and colouring agents (pigments).

The compounds of the invention can suitably be prepared according to procedures well known to those skilled in the art such as extrusion and melt blending. Examples of apparatus which may be used to prepare the compounds of the present invention include, but are not limited to, single or multiple screw extruders, mixing rollers, Brabender internal mixers, Banbury mills, and kneaders. For example, the compounds of the present invention may be prepared by feeding ingredients either partly or fully as a pre-blend or separately in a discontinuous or continuous mixer, preferably a continuous mixer. If first compounds are produced not containing a blowing agent then, more preferably, a twin-screw extruder, in particular a co-rotating twin-screw extruder is used.

Preferably, the compound ingredients are pre-blended as follows. First the block copolymer is blended with part or, preferably, all of the plasticiser. The plasticiser and block copolymer may be blended by contacting the plasticiser and oil and rolling, tumbling or mixing in suitable apparatus. Alternatively, the block copolymer and plasticiser may be melt mixed using apparatus such as single or multiple screw extruders, mixing rollers, Brabender internal mixers, Banbury mills, and kneaders. When pre-blending block copolymer and plasticiser is conducted in an extruder the plasticiser is typically metered into the extruder such that the metering rate is matched to the proportion of oil and polymer desired in the final compound.

The pre-blending step is typically carried out in a so-called turbo-mixer, such as a "Papenmeir" mixer.

The blend of block copolymer and plasticiser is then blended with polybutene-1, and any other ingredients such as filler, polyolefin, polyphenylene ether, stabilisers, waxes and/or pigments. Subsequently, blowing agent may be added, either in the same or a separate blending step. Alternatively, and most preferably, no blowing agent is added at this stage and first a compound without blowing agent is produced.

If a compound without blowing agent is produced, the compound may then Pre-blended or tumble mixed with a blowing agent to prepare a masterbatch as will be discussed in more detail herein after.

If a compound with blowing agent is produced, care should be taken that during the compounding process the temperature is kept below the blowing agent decomposition temperature unless (full or partial) foaming is desired during this first step.

According to a second aspect, the present invention relates to use of the polymeric compound as described herein for the preparation of foamed compounds.

According to a third aspect, the present invention relates to a foaming process, which comprises foaming a polymeric compound comprising (a) 100 parts by weight of a block copolymer comprising at least two external monovinyl aromatic hydrocarbon blocks and at least one internal hydrogenated conjugated diene block, wherein the total monovinyl aromatic hydrocarbon content is from 20 to 50% by weight and the total apparent molecular weight is from 140,000 g/mol to 400,000 g/mol;

(b) 50 to 250 phr of a plasticiser;

(c) 10 to 100 phr of a polybutene-1 polymer having a melt index at 2.16 kg/190° C. of from 0.05 to 400 with (d) a blowing agent.

It will be appreciated that the blowing agent according to the foaming process of the invention may be any one of the blowing agents discussed herein. Alternatively, the blowing agent may be a physical blowing agent. Physical blowing agents are well known to those skilled in the art and typically include water or inert gases like $CO_2$ and $N_2$ and/or steam.

The foaming process is preferably carried out during extrusion of the compound as described above with a blowing agent. The extrusion is typically carried out in a single-screw extruder (extrusion foaming). Alternatively, the foaming process is carried out by injection moulding.

The foaming process is typically carried out at a temperature in the range of from 120 to 250° C., but preferably as low as possible to be close to the melt temperature of the polybutene-1 that is used and to increase the melt strength. It belongs to the skill of the average skilled person to select appropriate foaming process conditions including appropriate foaming temperatures.

Although the invention as described herein is primarily directed to polymeric compounds containing a blowing agent fully incorporated in the compound during the compounding process, it is also possible, and in fact preferable, to make a compound not containing a blowing agent and dry-blending the blowing agent with the compound to produce a masterbatch blend. Therefore, according to a further aspect, the present invention relates to a masterbatch blend comprising a blowing agent and a compound, wherein the compound comprises (a) 100 parts by weight of a block copolymer comprising at least two external monovinyl aromatic hydrocarbon blocks and at least one internal hydrogenated conjugated diene block, wherein the total monovinyl aromatic hydrocarbon content is from 20 to 50% by weight and the total apparent molecular weight is from 140,000 g/mol to 400,000 g/mol;

(b) 50 to 250 phr of a plasticiser;

(c) 10 to 100 phr of a polybutene-1 polymer having a melt index at 2.16 kg/190° C. of from 0.05 to 400.

According to a further aspect, the present invention relates to a foamed compound obtainable by foaming the polymeric compound or the masterbatch blend as described herein.

According to yet another aspect, the present invention relates to articles containing the foamed compound. Examples of articles which can most advantageously be made from the foamed compounds are hollow profiles, e.g. for use in the automotive industry, such as hollow profiles for car doors.

The invention will now be described in more detail with reference to the Examples.

EXAMPLE 1

Compounds not containing blowing agent were prepared as follows. 100 parts by weight of a linear styrene-ethylene/butylene-styrene block copolymer was blended with 180 parts by weight of paraffinic oil in a Papenmeir mixer for 10 minutes at room temperature.

To the pre-blend thus obtained was added the desired amount (20 or 50 parts by weight) of polybutene-1, and the desired amount of polypropylene (0 or 10 parts by weight). Blending was continued for 5 min.

The pre-blend thus obtained was fed into a co-rotating twin-screw extruder and compounds were produced. The temperature in the twin-screw extruder ranged from 160 to 200° C. Table 1 depicts the composition of the compounds, all in parts by weight.

To test the melt strength and draw ratios at break, compounds were extruded in a Gottfert single screw laboratory extrusiometer (diameter=20 mm, L/D=20) equipped with a capillary die (L=40, D=3 and an entrance angle of 180°) and a melt pump. The melt pump ensures a constant throughput. The throughput was kept at 10 g/min for all the tests.

The extruded polymer strand was drawn in uniaxial extension by a take-up device (Rheotens apparatus). The tensile force necessary for stretching the polymer was recorded as a function of the speed of the wheels of the Rheotens apparatus. The acceleration of the wheels of the Rheotens apparatus was kept constant at 0.24 cm/s$^2$. The Melt Strength is the tensile force reached at break. Melt strength curves were measured at 150° C. and at 190° C. Results have been reported in Table 2.

Polypropylene PF 814 (MFI=3, 2.16 kg/230° C.) is a high Melt Strength polypropylene commercially available from Montell polyolefins. Polypropylene EltexP KL104 (MFI= 1.8, 2.16 kg/230° C.) is a polypropylene commercially available from Solvay. Polybutene-1 PB0110 and PB0200 have a melt flow index of 0.4 and 1.8 g/10 min (2.16 kg/190° C.) respectively. The melting point is around 125° C. The crystallinity of both polybutene-1 polymers is 55% as determined after 7 days. Polybutene-1 DP8010 has a melt flow index of 0.25 g/10 min (2.16 kg/ 190° C.) and a melting point of 90° C. The crystallinity is 33%, as determined after 7 days. Polybutene-1 PB0110, PB0200, and DP8010 are commercially available from Montell polyolefins. Paraffinic oil is PRIMOL 352 (PRIMOL is a trade mark). As block copolymer was used KRATON G1651 Polymer, a linear styrene-ethylene/butylene-styrene block copolymer having a polystyrene content of 33% by weight, commercially available from Shell Chemicals companies (KRATON is a trade mark). IRGANOX 1010 and PS 800 are stabilizers. IRGANOX 1010 is tetrakis-ethylene-(3,5-di-tertiary-butyl-4-hydroxy-hydrocinnamate) methane. IRGANOX PS 800 is dilauryl thiopropionate.

TABLE 2

|   | 190° C. | | 150° C. | |
|---|---|---|---|---|
|   | Force in cN | Draw ratio at break | Force in cN | Draw ratio at break |
| A | 5.3 | 4.6 | 10.2 | 4.6 |
| B | 5.5 | 4.2 | 9.0 | 4.2 |
| C | 5.9 | 3.8 | 6.1 | 4.6 |
| D | nm | nm | 5.0 | 5.3 |
| E | nm | nm | 5.0 | 5.7 |
| F* | 6.3 | 5.0 | 4.5 | 3.4 |
| G* | 8.3 | 2.3 | 7.6 | 4.2 | nm = not measured

Table 2 shows the effect of temperature. Melt Strength increases when decreasing temperature, whilst draw ratios at break do not change much for polybutene-1 containing compounds. Draw ratio's are higher in compounds containing only polybutene-1 and no polypropylene. Without wishing to be bound by a particular theory, it would appear that the best foamed compounds can be obtained with compounds having a high drawability. Compound E containing polybutene-1 PB 0110 gives the best results.

The results of melt strength measurements for compounds H, I and J are reported in Table 3.

TABLE 1

| Compound | A | B | C | D | E | F* | G* | H | I | J |
|---|---|---|---|---|---|---|---|---|---|---|
| block copolymer | 100 | 100 | 100 | 100 | 100 | 100 | 100 | 100 | 100 | 100 |
| paraffinic oil | 180 | 180 | 180 | 180 | 180 | 180 | 180 | 100 | 100 | 100 |
| Polybutene-1 PB0110 | 20 |  |  |  | 50 |  |  | 34 | 54 | 74 |
| Polybutene-1 PB0200 |  | 20 |  |  |  |  |  |  |  |  |
| Polybutene-1 DP8010 |  |  | 20 | 50 |  |  |  |  |  |  |
| Polypropylene PF814 | 10 | 10 | 10 |  |  |  | 30 |  |  |  |
| Polypropylene EltexP KL104 |  |  |  |  |  | 30 |  |  |  |  |
| IRGANOX 1010 | 0.2 | 0.2 | 0.2 | 0.2 | 0.2 | 0.2 | 0.2 | 0.2 | 0.2 | 0.2 |
| PS 800 | 0.2 | 0.2 | 0.2 | 0.2 | 0.2 | 0.2 | 0.2 | 0.2 | 0.2 | 0.2 |

*Comparative Examples (IRGANOX is a trade mark.)

TABLE 3

| | 170° C. | |
| --- | --- | --- |
| | Force in cN | Draw ratio at break |
| H | 10 | 4.5 |
| I | 8 | 6 |
| J | 6 | 7.5 |

It can be seen from the table that an increase in the polybutene-1 content leads to an increase in the Draw ratio (drawability).

EXAMPLE 2

Compounds A–E obtained in Example 1 were dry-blended with 4% by weight of azodicarbonamide as a blowing agent to prepare masterbatches A–E. The masterbatches thus obtained were fed into a single screw extruder, using a temperature profile of 140° C. at the feed entrance, 155° C. at the end of the extruder and 150° C. at the sheet die, to prepare foamed compounds A–E. The density of the foamed compounds were measured. The density of the compounds prior to foaming was 0.9. Results are shown in Table 4.

TABLE 4

| Foamed compound | Density |
| --- | --- |
| A | 0.79 |
| B | 0.78 |
| C | 0.77 |
| D | 0.74 |
| E | 0.71 |
| F* | 0.79 |
| G* | 0.80 |
| H | 0.72 |
| I | 0.71 |
| J | 0.63 |

The best density decrease is obtained while air cooling the foamed sheets (foamed compounds). It was found that foamed compounds containing the most crystalline polybutene-1 (PB0110) had the lowest density whilst maintaining a good balance of properties such as a good surface appearance.

Compound E containing polybutene-1 gives a better density reduction than compound F or G containing polypropylene. Compounds E, F and G were formulated such that the Shore A hardness was the about same (Shore A 25–30).

The foaming conditions have not been optimised. It will be appreciated that further optimisation of foaming conditions such as optimum temperature and temperature profiles, extrusion or injection processing parameters will lead to further density reduction to e.g. 0.5. It belongs to the normal skill of the average skilled person to optimise foaming conditions.

EXAMPLE 3

Compound K was prepared by compounding 30 phr of polyphenylene ether with compound E. The hardness of compound K was 33 Shore A.

Compression set measurements were carried out at room temperature for 22 h, in accordance with ISO815. The results are shown in Table 5.

TABLE 5

| | Compound K | Compound E |
| --- | --- | --- |
| Relaxation at room T | 67% | 46% |

Compound K was foamed using a tube die rather than a sheet die as in the previous Example. A single screw extruder was used containing four temperature zones allowing for better control of the temperature profile. A tube profile with a good skin was produced. The density obtained ranged from 0.6 to 0.52.

Compound K has a very good compression set which is important for e.g. hollow window profile applications.

It is known that polybutene-1 crystallises only slowly. If desired, nucleating agents may be used to increase the crystallisation rate. Nucleating agents are well known to those skilled in the art and available commercially. The most popular nucleating agent is Talc, but the use of stearamide is also well known.

I claim:

1. A polymeric compound comprising
   (a) 100 parts by weight of a block copolymer comprising at least two external monovinyl aromatic hydrocarbon blocks and at least one internal hydrogenated conjugated diene block, wherein the total monovinyl aromatic hydrocarbon content is from 20 to 50% by weight and the total apparent molecular weight is from 140,000 g/mol to 400,000 g/mol;
   (b) 50 to 250 phr of a plasticiser;
   (c) 10 to 100 phr of a polybutene-1 polymer having a melt index at 2.16 kg/190° C. of from 0.05 to 400; and
   (d) a blowing agent.

2. The polymeric compound of claim 1 wherein the total apparent molecular weight of the block copolymer is in the range from 160,000 to 210,000 g/mol.

3. The polymeric compound of claim 1 wherein the total apparent molecular weight of the block copolymer is in the range from 220,000 to 300,000 g/mol.

4. The polymeric compound of claim 1 wherein the conjugated diene is butadiene and the 1,2 vinyl content of the butadiene block prior to hydrogenation is at least 25% by weight.

5. The polymeric compound of claim 1 wherein the amount of (c) is from 15 to 90 phr.

6. The polymeric compound of claim 1 further comprising 5 to 50 phr of a polyolefin other than polybutene-1, having a melt flow index at 230° C. and 2.16 kg of 0.1 to 40.

7. The polymeric compound of claim 6 wherein the polyolefin is polypropylene.

8. The polymeric compound of claim 1 wherein the blowing agent is present in an amount from 0.5 to 10% wt., basis the total composition.

9. The polymeric compound of claim 8 wherein the blowing agent is selected from azodicarbonamide, sodium bicarbonate, or mixtures thereof, and/or heat expandable thermoplastic particles encapsulating heat expandable gas or liquified gas.

10. The polymeric compound of claim 1 further comprising polyphenylene ether (PPO) in an amount from 10 to 100 phr.

11. The polymeric compound of claim 1 wherein the polybutene-1 has a crystallinity of at least 30% by weight when measured with wide-angle X-ray diffraction.

12. The polymeric compound of claim 1 wherein the polybutene-1 contains up to 15 mol % of copolymerised ethylene or propylene.

13. The polymeric compound of claim 4 wherein the polybutene-1 has a crystallinity of at least 30% by weight when measured with wide-angle X-ray diffraction.

14. A foaming process, which comprises foaming a polymeric compound comprising
   (a) 100 parts by weight of a block copolymer comprising at least two external monovinyl aromatic hydrocarbon blocks and at least one internal hydrogenated conjugated diene block, wherein the total monovinyl aromatic hydrocarbon content is from 20 to 50% by weight and the total apparent molecular weight is from 140,000 g/mol to 400,000 g/mol;
   (b) 50 to 250 phr of a plasticiser;
   (c) 10 to 100 phr of a polybutene-1 polymer having a melt index at 2.16 kg/190° C. of from 0.05 to 400 with (d) a blowing agent.

15. A foamed compound prepared by foaming a polymeric compound of claim 1.

16. A foamed compound prepared by the foaming process of claim 14.

17. A masterbatch blend of a compound and a blowing agent, wherein the compound comprises
   (a) 100 parts by weight of a block copolymer comprising at least two external monovinyl aromatic hydrocarbon blocks and at least one internal hydrogenated conjugated diene block, wherein the total monovinyl aromatic hydrocarbon content is from 20 to 50% by weight and the total apparent molecular weight is from 140,000 g/mol to 400,000 g/mol;
   (b) 50 to 250 phr of a plasticiser; and
   (c) 10 to 100 phr of a polybutene-1 polymer having a melt index at 2.16 kg/190° C. of from 0.05 to 400.

18. A foamed compound prepared by foaming a masterbatch blend of claim 17.

19. An article containing the foamed compound of claim 15.

20. An article containing the foamed compound of claim 16.

21. An article containing the foamed compound of claim 18.

* * * * *